(12) United States Patent
Nock

(10) Patent No.: US 7,261,055 B2
(45) Date of Patent: Aug. 28, 2007

(54) BIRD FEEDING APPARATUS

(75) Inventor: Robert Kenneth Nock, West Midlands (GB)

(73) Assignee: CJ Wildbird Foodslimited, Shrewsbury (GB)

( * ) Notice: Subject to any disclaimer, the term of this patent is extended or adjusted under 35 U.S.C. 154(b) by 0 days.

(21) Appl. No.: 10/864,597

(22) Filed: Jun. 10, 2004

(65) Prior Publication Data
US 2005/0000456 A1 Jan. 6, 2005

(30) Foreign Application Priority Data
Jun. 13, 2003 (GB) ................... 0313652.0

(51) Int. Cl.
*A01K 39/00* (2006.01)
(52) U.S. Cl. .................. 119/51.01; 119/61.57
(58) Field of Classification Search ............ 119/51.01, 119/61.57; D30/124–128
See application file for complete search history.

(56) References Cited

U.S. PATENT DOCUMENTS

| 1,596,333 | A | | 8/1926 | Boyle | |
|---|---|---|---|---|---|
| 1,706,887 | A | * | 3/1929 | Knostman | .................. 211/85.3 |
| D262,917 | S | * | 2/1982 | Kilham | ..................... D30/127 |
| 4,355,597 | A | * | 10/1982 | Blasbalg | .................... 119/57.8 |
| 4,421,061 | A | * | 12/1983 | Shomer | ....................... 119/81 |
| D282,019 | S | * | 12/1985 | Kilham | ..................... D30/127 |
| 4,829,934 | A | * | 5/1989 | Blasbalg | .................... 119/57.8 |
| 5,215,039 | A | * | 6/1993 | Bescherer | ................. 119/57.8 |
| D385,067 | S | * | 10/1997 | Whittles | ..................... D30/124 |
| 5,701,842 | A | | 12/1997 | Whittles | |
| 5,937,788 | A | | 8/1999 | Boyd | |
| 6,050,221 | A | | 4/2000 | Eaton et al. | |
| 6,192,832 | B1 | | 2/2001 | Husnik | |
| D452,048 | S | * | 12/2001 | Colwell | ..................... D30/119 |
| 6,453,843 | B2 | * | 9/2002 | Bescherer | ................ 119/51.01 |
| 6,539,892 | B1 | | 4/2003 | Bescherer | |
| 6,584,932 | B2 | * | 7/2003 | Rogers et al. | ............. 119/57.9 |
| 2003/0062000 | A1 | | 4/2003 | Rogers et al. | |

* cited by examiner

*Primary Examiner*—Kimberly S. Smith
(74) *Attorney, Agent, or Firm*—Buchanan Ingersoll & Rooney PC

(57) ABSTRACT

A bird feeder hanger assembly having a pivot member adapted to be pivotably attached to the main body of a bird feeder; the pivot member having engaging means comprising a slot or the like; a hanger member also having engaging means configured to co-operate with the first member engaging means such that when connecting the assembly to the main body of a bird feeder the hanger member can first be pushed into the slot of the pivot member and then pulled along an axis of the slot so that the engaging means of the hanger member and the engaging means of the pivot member mutually engage.

19 Claims, 5 Drawing Sheets

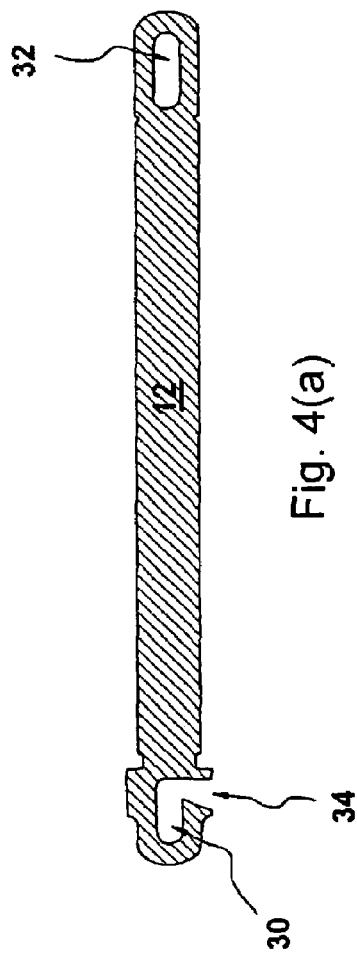
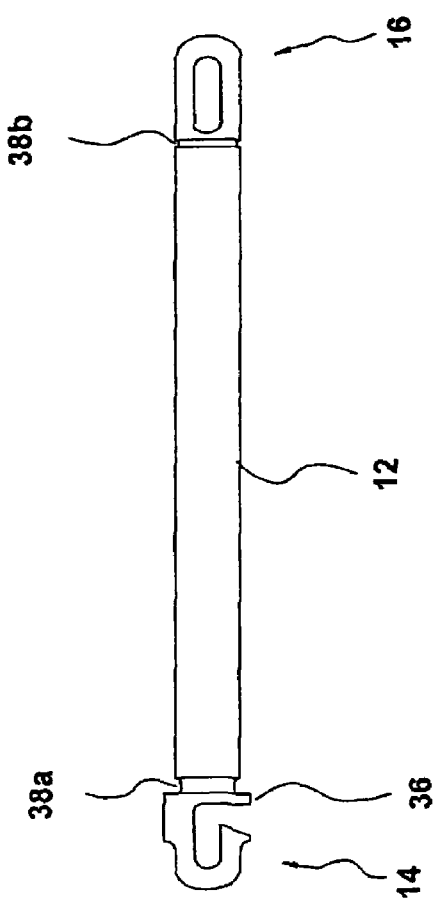

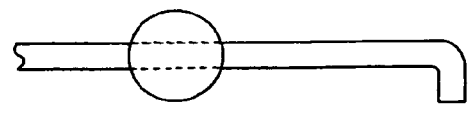
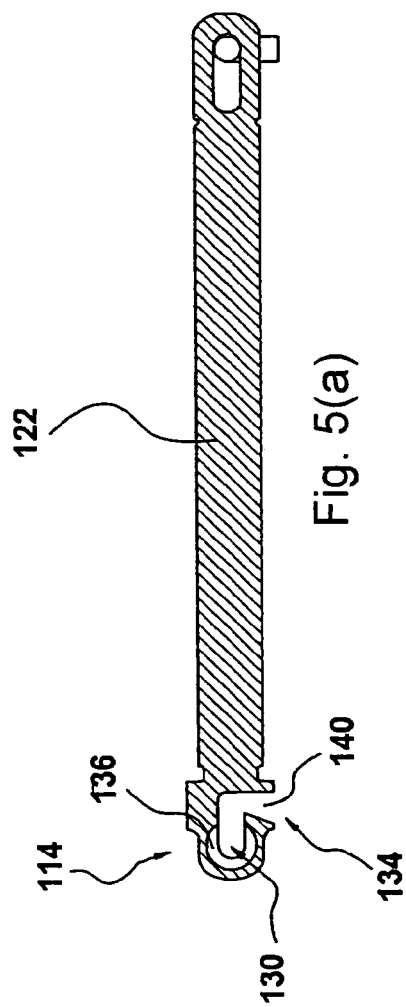
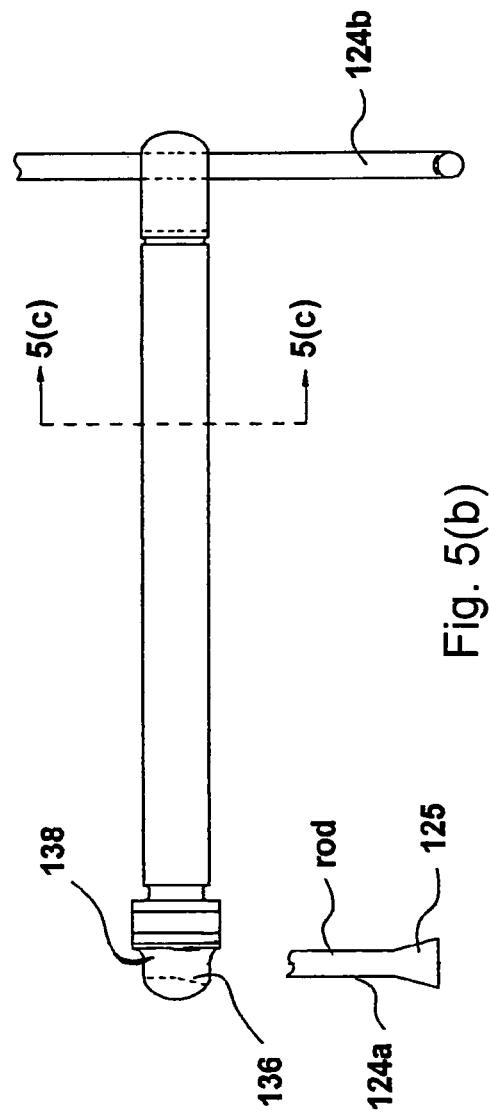

BIRD FEEDING APPARATUS

BACKGROUND OF INVENTION

The present invention relates to animal feeding apparatus, and in particular to a detachable hanger for a bird feeder.

Bird feeders typically comprise a tubular shaped main body with a base, a lid and at least one feeding port. Such feeders frequently have a hanger assembly comprising a hanger rod that has a semicircular or apex shaped top and a pair of parallel side arms; the lid typically has a pair of diametrically opposed holes located near the rim sized to accept the side arms and allow them to slide freely up and down within the holes. The side-arms engage a hole at each end of a pivot rod and the pivot rod engages holes located at diametrically opposite sides of the main body. Such an arrangement allows the hanger rod to be stowed within the main body when not in use. This also allows the feeder to be supplied with less packaging. The lid of the feeder may be removed from the main body by sliding it upwardly; once free of the main body the lid can be tilted to one side by the pivotable mount. This allows entry to the top of the feeder for replenishing with bird food. However, such arrangements do not allow side arms to be detached from the pivot rod and so suffer the disadvantage that the pivot rod cannot be removed from the main body to allow cleaning etc.

BRIEF SUMMARY OF THE INVENTION

An object of the present invention is to provide a bird feeder hanger assembly where the hanger rod and pivot rod may readily be detached from the main body of a feeder to facilitate cleaning.

In one aspect the invention provides an animal feeder assembly comprising a body and a hanger member wherein the hanger member is adapted for pivotal attachment to the body; the hanger member and the body each having mutual engagement means; said engagement means allowing both engagement and disengagement of the hanger member to and from the body.

In another aspect the invention provides a bird feeder hanger assembly comprising a hanger member and a pivot member wherein the pivot member is adapted to be attached to the main body of a bird feeder such that the pivot member pivots about an axis; the pivot member and hanger member each having engaging means for engaging one another wherein the engaging means co-operate such that when connecting the hanger assembly to the main body of a bird feeder the engaging means of the hanger member is adapted first be pushed into the engaging means of the pivot member and then pulled in a direction generally radial to the pivot axis so that the hanger member and the pivot member mutually engage.

In another aspect the invention provides a bird feeder hanger assembly comprising a hood, a hanger member and a pivot member wherein the pivot member is adapted to be pivotably attached to the main body of a bird feeder; the pivot member and hanger member each having mutually engaging means; wherein the hanger member comprising an elongate element that in use passes through an aperture in the hood such that the hanger member is secured to the pivot member through engagement of the hood and the main body.

In a further aspect the invention provides an animal feeder assembly with a hood and hanger member; the hanger member comprising an elongate rod, adapted for pivotal attachment to the main body of an animal feeder wherein the rod passes through an aperture in the hood and in use the hanger member is secured to the main body by engaging the hood with the main body.

BRIEF DESCRIPTION OF DRAWINGS

Examples of the invention will now be described by reference to the following diagrammatic figures in which:

FIG. 4(a) shows a cross-sectional view taken generally along longitudinal axis A-A' in FIG. 1, and FIGS. 4(b)-4(c) show a side view and end view of the pivot rod of the assembly of FIG. 1; and FIG. 5(a) shows a cross-sectional view taken generally along the longitudinal axis of the pivot rod of the assembly for a second embodiment of the invention, FIG. 5(b) shows a side view of the pivot rod and FIG. 5(c) shows a cross section taken generally along the line 5(c)-5(c) in FIG. 5(b).

DETAILED DESCRIPTION OF THE INVENTION

Figure 1:
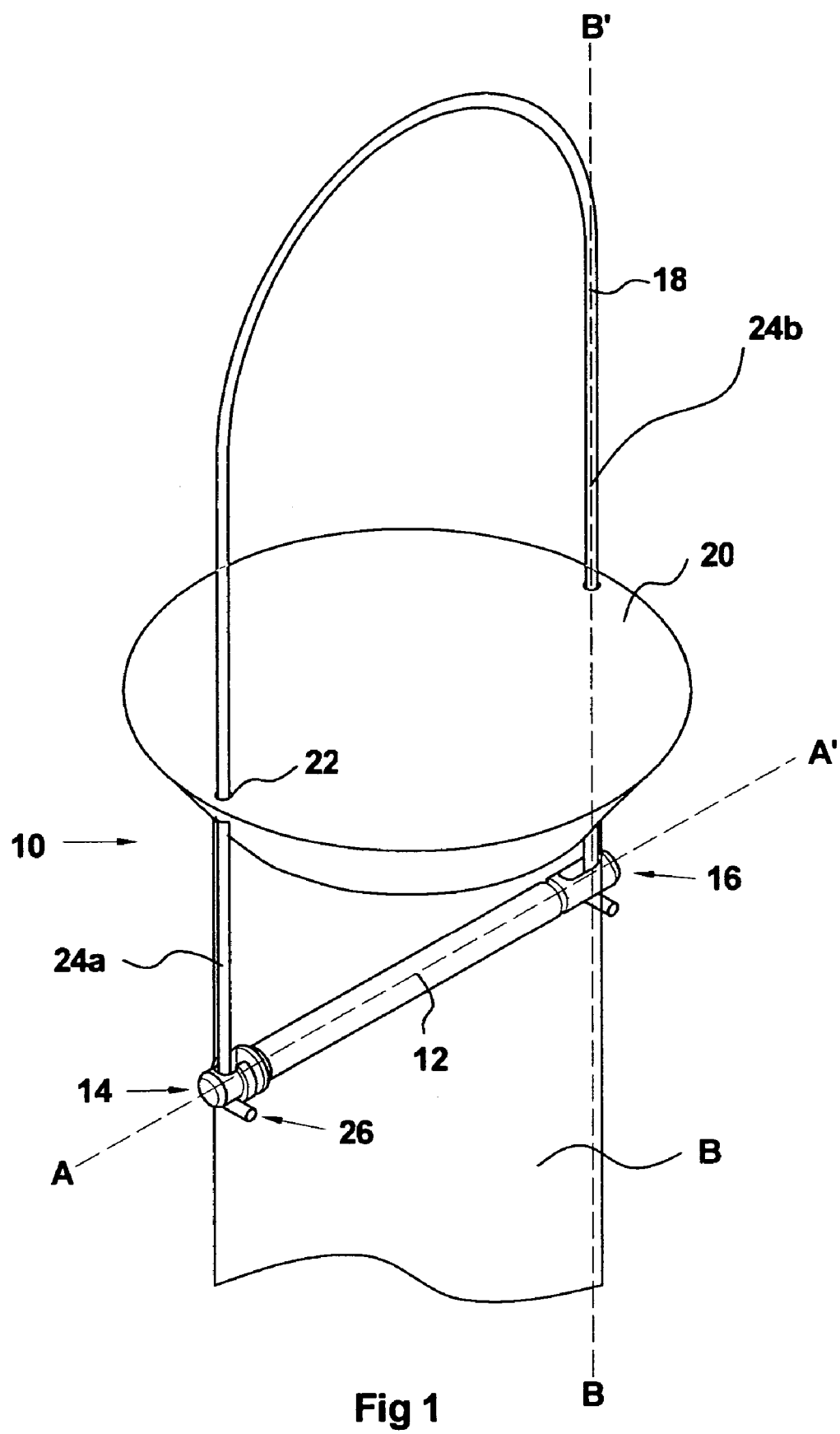
FIG. 1 shows a perspective view of a hanger assembly, according to a first embodiment of the invention, the hanger being in a closed position and attached to the upper portion of a feeder main body.

A first embodiment of the invention is illustrated in FIGS. 1 to 4(c). The hanger assembly 10 comprises a pivot rod 12, with a first engaging end 14 and a second engaging end 16; a generally "inverted U-shaped" hanger rod 18 and a lid 20. Lid 20 and pivot rod 12 are sized to engage the circular tubular main body B (top only shown, see FIG. 2) of a bird feeder. FIG. 1 shows the hanger assembly 10 attached to the main body B of a bird feeder with the assembly in the closed position; as used when the bird feeder is hung outdoors with bird feed inside. The lid 20 has a pair of diametrically opposed holes 22 located near the periphery positioned and sized to accept the parallel side members 24a and 24b of hanger rod 18. Hanger rod 18 can take many forms and need not be "U-shaped". However, when the hanger assembly includes a lid 20 then the hanger rod 18 will normally include a pair of parallel elongate members (24). The first engaging end 14 of the rod 12 has a hook-shaped cross section (see FIG. 4(a)) that provides a "L-shaped" slot 30, sized to accept the end of side member 24a of hanger rod 18. Between slot 30 and the rod a flange 36 is provided in order to help locate pivot rod 12 within holes in a bird feeder main body B. Side members 24a and 24b have a 90°0 bent section 26 near each end. The second engaging end 16 has a hole 32 that is approximately rectangular in cross section but that has hemi-spherically shaped end walls. Grooves 38a and 38b are located proximal each end of rod 12 the separation distance of these grooves being equal to the diametric dimension of main body B; thus, these grooves locate the walls of the main body B and so facilitate the pivoting action of rod 12 relative to main body B.

Figure 2:
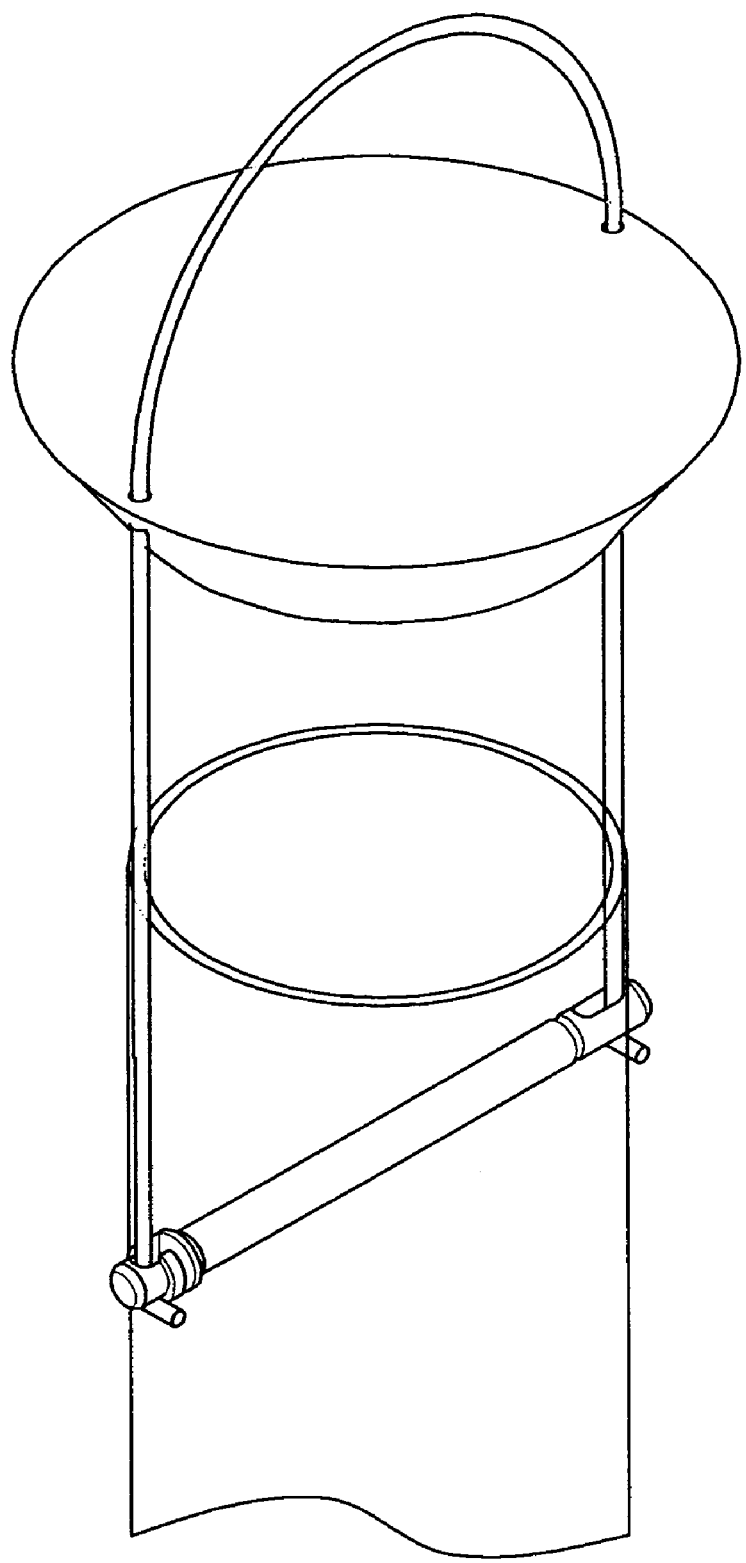
FIGS. 2 and 3 show the hanger shown in FIG. 1 in a partly open and a fully open position respectively.
Figure 3:
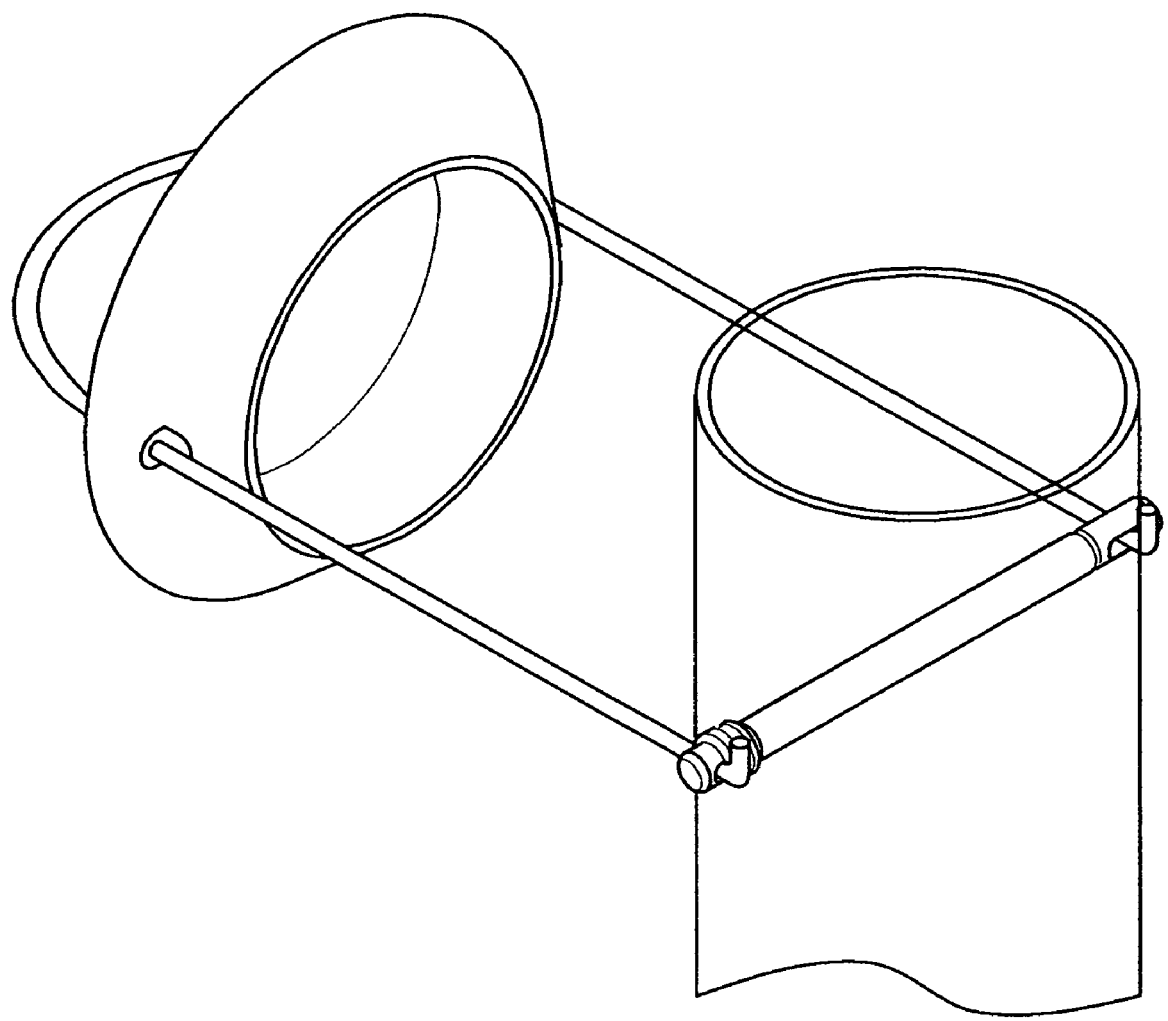

In use, the lid 20 of the hanger assembly 10 may be slid upwardly, guided by side members 24a and 24b so that the lid 20 is detached from the main body B of a bird feeder (see FIG. 2). The hanger rod 18 and lid 20 may then be pivoted about axis A-A' by means of the action of pivot rod 12 that locates in holes located diametrically in the main body B of the bird feeder. FIG. 3 shows the hanger assembly in this fully open position. In this position bird feed may conveniently be charged to a feeder.

The hanger assembly may easily be detached from the main body B of a bird feeder in order to allow thorough cleaning etc. When the assembly is attached to a bird feeder B as shown in FIG. 1, side member 24a is first flexed inwardly towards the axis of the main body B; this allows it to slide through channel 34 and so be released from the first engaging end 14. This action is facilitated if rod 18 has resilience; for example, if it is a steel rod. Lid 20 can be detached from the main body B just before or just after this step. The lid 20 and hanger rod 18 can then be rotated by about 180° around the axis B-B' of side member 24b. This allows side member 24b of hanger rod 18 to be detached from hole 32 in the second end 16 of rod 12, and thus for rod 12 to be slid outwardly through the rear hole on main body B and so the assembly is fully detached. Replacement of the assembly is achieved simply by reversing the above sequence of steps. It will be noted that when the assembly is in use as shown in FIG. 1 that the lid 20 is quite close to the free ends of side members 24. This effectively prevents side member 24a being flexed inwardly as required for the first step of removal. Therefore, in this position the lid locks the hanger assembly to the main body B.

A second embodiment of the invention is illustrated in FIGS. 5(*a*)-5(*c*). In this embodiment side member 124a has a frustro-conical end section 125 rather than the 90° bend used in the first embodiment. Thus, rod 122 differs from the rod of the first embodiment in respect of the configuration of the first engaging end 114. In this embodiment the "L-shaped" slot 30 of the first embodiment has been modified 130 to include a frustro-conical recess portion 136. Thus, side member 124a may be pushed into entry slot 140 and then moved along the "L-shaped" slot 130 until the longitudinal axis of side member 124a is coincident with the axis of the frustro-conical recess 136; at which point side member 124a may be drawn upwardly so that the frustro-conical end section 125 of side member 124a locks within frustro-conical recess 136. The mode of opening and removing the hanger assembly of the second embodiment is the same as for the first embodiment described above.

In a variant of this embodiment the "L-shaped" slot may be replaced by a straight slot that extends only radially with respect to the longitudinal axis of rod 122. While this is less preferable than the "L-shaped" arrangement it does offer the virtue of allowing the "U-shaped" rod to be rigid and have no flexing property.

The conical end section 125 may be replaced by mechanically equivalent alternatives, such as a hemispherical end; in this event recess 136 would be suitably shaped to engage this alternative shape of end section.

I claim:

1. A feeder assembly comprising:
   a birdfeeder;
   a hanger member and a pivot member adapted to be pivotally attached to the birdfeeder and thereby pivot about a pivot axis;
   wherein said hanger member comprises an elongate member with at least one radially extending end portion;
   wherein said pivot member further comprises at least one channel having at least a first portion and a second portion that in use engages said at least one end portion such that the hanger member is removably attached to the pivot member; and
   wherein said hanger member is detachable from said pivot member by movement of said elongate member and said at least one end portion relative to said pivot member through said at least one channel, said movement including:
   movement of said elongate member through said first portion in a direction along said pivot axis; and then
   movement of said elongate member through said second portion in a direction radial to said pivot axis.

2. An assembly according to claim 1 wherein the pivot member comprises a rod that engages a body of the bird feeder at locations positioned on diametrically opposite sides of the body.

3. An assembly according to claim 2 wherein the at least one channel is defined by a slot located proximal an end of said rod.

4. An assembly according to claim 1 wherein the hanger member comprises a pair of parallel side arms both of which engage the pivot member.

5. An assembly according to claim 1 wherein the hanger member also engages a lid sized to fit a bird food charging opening in the bird feeder.

6. An assembly according to claim 1 wherein the hanger member is formed from a rod.

7. An assembly according to claim 6 wherein at least said one hanger member end portion comprises an angled bend in the rod.

8. An assembly according to claim 6 wherein at least said one hanger member end portion comprises a frustro-conical shaped end section.

9. An assembly according to claim 1 wherein the at least one channel having at least a first portion and a second portion defines a generally L-shaped slot formed in at least one end portion of the pivot member.

10. An assembly according to claim 9 wherein the pivot member further comprises a generally rectangular slot formed in the other portion of said pivot member.

11. An assembly according to claim 1 wherein the at least one channel of the pivot member includes a tapered recess.

12. An assembly according to claim 11 wherein the pivot member further comprises a generally rectangular slot formed in the other end portion of said pivot member.

13. An assembly according to claim 1 further comprising a hood adapted to engage a main body of the bird feeder, said hood having an aperture and wherein the elongate member, when in use, passes through said aperture such that the hanger member is secured to the pivot member through engagement of the hood and the main body.

14. An assembly according to claim 1 wherein said at least one radially extending end portion has a predetermined configuration, said hanger member and said pivot member being detachable and re-attachable to one another without altering said predetermined configuration of said at least one radially extending end portion.

15. An assembly according to claim 14 wherein said predetermined configuration is defined by an angled bend.

16. An assembly according to claim 1 wherein said at least one radially extending end portion has a predetermined configuration, wherein said hanger assembly defines a first assembled state and a second detached state, wherein said predetermined configuration is maintained in the first assembled state, in the second detached state, and during transition from the first assembled state to the second detached state.

17. An assembly according to claim 1,
wherein said at least one radially extending end portion has a predetermined configuration, said hanger member and said pivot member being detachable and re-attachable to one another without altering said predetermined configuration of said at least one radially extending end portion.

18. An assembly according to claim 1,
wherein said at least one radially extending end portion has a predetermined configuration,
wherein said hanger assembly defines a first assembled state and a second detached state,
wherein said predetermined configuration is maintained in the first assembled state, in the second detached state, and during transition from the first assembled state to the second detached state.

19. A bird feeder hanger assembly according to claim 1 wherein during detachment of said hanger member by movement of said elongate member in a direction of said pivot axis, said elongate member moves towards said bird-feeder.

* * * * *